United States Patent [19]

Koyanagi

[11] 4,455,867
[45] Jun. 26, 1984

[54] METHOD OF DETECTING CONTROL ERROR IN DIGITAL CONTROL

[75] Inventor: Yuzo Koyanagi, Warabi, Japan

[73] Assignee: Sanwa Seiki Mfg. Co., Ltd., Saitama, Japan

[21] Appl. No.: 317,605

[22] Filed: Nov. 3, 1981

[30] Foreign Application Priority Data

Nov. 7, 1980 [JP] Japan ............................ 55-155772
Nov. 26, 1980 [JP] Japan ............................ 55-166201
Dec. 27, 1980 [JP] Japan ............................ 55-189101

[51] Int. Cl.³ .................................................. G01M 15/00
[52] U.S. Cl. ...................................... 73/119 A; 371/30
[58] Field of Search ............... 73/119 A, 1 R; 371/30; 123/486

[56] References Cited

U.S. PATENT DOCUMENTS

| | | | |
|---|---|---|---|
| 4,275,695 | 6/1981 | Bauer et al. | 123/486 |
| 4,313,412 | 2/1982 | Hosaka et al. | 123/486 X |
| 4,345,561 | 8/1982 | Kondo et al. | 123/486 X |
| 4,348,729 | 9/1982 | Sasayama et al. | 123/486 X |

Primary Examiner—Jerry W. Myracle
Attorney, Agent, or Firm—Norbert P. Holler; Charles A. Blank

[57] ABSTRACT

A method of controlling a digital actuator which controls the fuel injection pump for the internal combustion engine. In the control method for minimizing the difference between the reference command value and the resultant controlled value in response to the reference command value, the command signal is issued in such a way that the time interval from a command signal which has been issued based on the difference and the subsequent command signal is longer than a predetermined period.

6 Claims, 10 Drawing Figures

METHOD OF DETECTING CONTROL ERROR IN DIGITAL CONTROL

The present invention relates to a method of detecting the control error in digital control for controlling the fuel injection timing of the vehicle engine.

In the conventional digital control for minimizing the difference between the reference command value and the resultant controlled output in response to the reference command value, the pulse width of each control signal is determined in consideration of the control response of the load. The control unit of the final-stage actuator which is controlled by the control signal generally has a mechanical or electrical inertia, causing the control unit to prolong the operation after the control signal has ceased or to respond to the control signal with a delay.

Consequently, the deviation is checked again in the delayed response time, and a succeeding action, e.g. reduction of the deviation, based on the check becomes necessary. If another control signal is issued within the response delay time following the first control signal, the control unit is subjected to the second control signal with a finite duration before completion of the operation due to the first control signal, resulting virtually in a reception of a single pulse signal having a long duration.

In this case, no problem will result so far as the sensitivity of the control system is low, however, as the sensitivity is made higher, a large overshoot will result, posing problems.

When the deviation is checked again in the response delay time, and if the duration of inaccurate deviation is integrated based on the check to determine the abnormality of control, an erroneous determination will result.

It is therefore an object of the present invention to solve the foregoing problems in control and to provide a method of detecting the control error in digital control which allows a high control response and determination of the normality of control.

According to the present invention, there is provided a method of detecting the control error in digital control for minimizing the difference between the reference command value or the reference command value indicated following said reference command value and the resultant controlled output by use of the command pulse signal, comprising the step of carrying out determination for subsequent control determination following a first command signal issued in response to a deviation on the basis of a deviation which is detected after a certain period following the application of the first command signal.

These and other objects, features and advantages of the present invention will be more apparent from the following description taken in conjunction with the accompanying drawings, in which.

Figure 1:
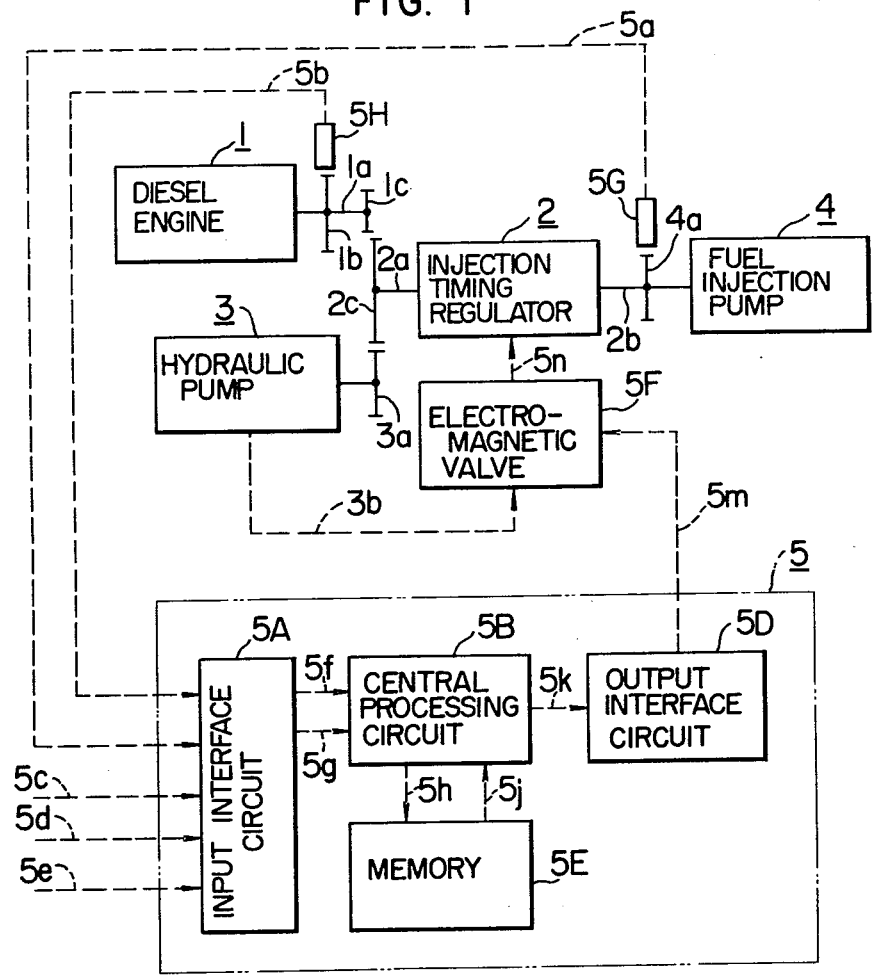
FIG. 1 is a systematic diagram of the method of detecting the control error in digital control according to the present invention applied to the fuel injection timing regulator 2 for the diesel engine 1.

The present invention will now be described by way of embodiment. FIG. 1 is a systematic diagram of the method of detecting the control error in digital control embodying the present invention applied to the injection timing regulator 2 of the fuel injection pump 4 for the diesel engine 1. The hydraulic actuator described in the following is incorporated within the injection timing regulator 2. A pinion 1c provided on a crank shaft 1a of the diesel engine 1 is in the engagement to a gear 2c provided on an input shaft 2a of the injection timing regulator 2, and an output shaft 2b of the injection timing regulator 2 is adapted to drive the fuel injection pump 4. The injection timing regulator 2 varies the rotational phase angle between the input shaft 2a and the output shaft 2b in response to the operational condition of diesel engine 1, so as to appropriately adjust the injection timing for the fuel injection pump 4. The injection timing regulator 2 per se is one known in the art.

A hydraulic pump 3 is driven through the gears 2c and 3a to supply a constant pressure to an electromagnetic valve 5F through a piping 3b.

The crank shaft 1a has at its end a disk 1b, and the output shaft 2b also has a similar disk 4a with circumference thereof provided with a train of bosses disposed at a constant interval. Confronting the circumference of the disks 1b and 4a, there are fixedly provided electromagnetic pickups 5H and 5G, respectively, for detecting the rotation of the disks. Reference numbers 5a and 5b denote signal lines.

A signal line 5c transmits the displacement of the acceleration pedal for operating the diesel engine 1 to an input interface circuit 5A, a signal line 5d transmits the signal of the coolant temperature in the water jacket of the diesel engine 1 to the input interface circuit 5A, and a signal line 5e transmits the signal of the air temperature to the input interface circuit 5A.

The input interface circuit 5A, a central processing circuit 5B, a memory 5E and an output interface circuit 5D constitute a microcomputer 5. A signal line 5k is made up of one signal line 5k1 shown in FIG. 3 and another signal line 5k2 which is not shown in the figure. The output of the microcomputer 5 is adapted to control the electromagnetic valve 5F through a signal line 5m, and the valve 5F operates the hydraulic actuator within the injection timing regulator 2 through a hydraulic pipe 5n.

Figure 2:
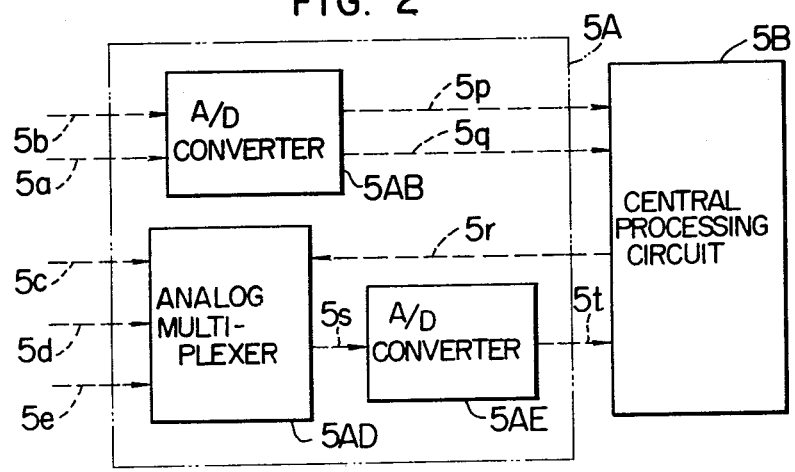
FIG. 2 is a block diagram of the input interface circuit 5A shown in FIG. 1.

The input interface circuit 5A consists of a Schmitt circuit 5AB, an analog multiplexer 5AD and an A/D converter 5AE as shown in FIG. 2, where reference numbers 5p, 5q, 5r, 5s, and 5t denote signal lines.

Figure 3:
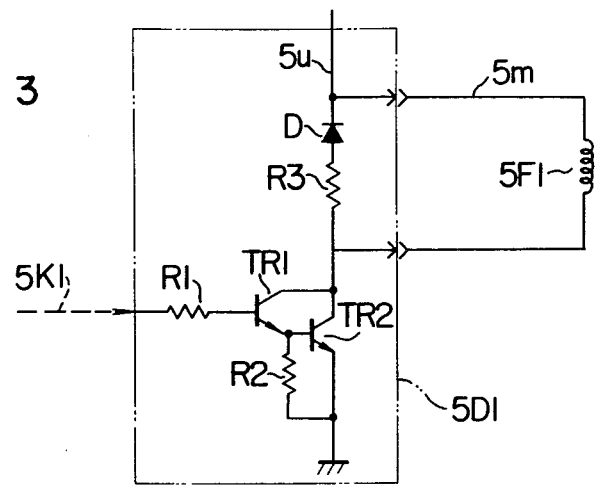
FIG. 3 is a circuit diagram of one (5D1) of the output interface circuits 5D shown in FIG. 1.

FIG. 3 shows an output interface circuit 5D1 which is one of circuits included in the output interface circuit 5D, where a resistor R1 has one end connected with the signal line 5k1 from the central processing circuit 5B. The signal line 5m1 is connected to a solenoid 5F1 of the electromagnetic valve 5F in FIG. 1, and a line 5u is connected to a constant voltage source. The output interface circuit 5D1 further includes a flywheel diode D, resistors R2 and R3, and transistors TR1 and TR2. Another output interface circuit having another input line 5k2 has the same circuit arrangement as that of FIG. 3, and the explanation thereof will be omitted.

The operation of the system arrangement shown in FIGS. 1, 2 and 3 will now be described in the following. The diesel engine 1 operates in response to the displacement of the acceleration pedal (not shown in the figures). The fuel injection pump 4 is driven through the crank shaft 1a, the gears 1c and 2c, the input shaft 2a, the injection timing regulator 2, and its output shaft 2b. The injection timing regulator 2 is controlled depending on the rotational speed of the diesel engine 1, the displacement of the accelerator pedal, the temperature of the coolant in the water jacket (hereinafter will be called simply the coolant temperature), and the state of the air. Through that control, the hydraulic actuator within the injection timing regulator 2 is operated in one direction or another by the hydraulic signals (control power) through the pipes 5n. Consequently, the injection timing regulator 2 varies the relative rotational phase angle between the input shaft 2a (i.e., the rotational angle of the crank shaft 1a) and the output shaft 2b, so as to appropriately determine the timing of the activation of the fuel injection pump 4.

In accomplishing the timing of injection, the microcomputer 5 outputs a command signal to switch the electromagnetic valve 5F in one direction or another, and a powered hydraulic signal from the valve 5F operates the injection timing regulator 2. The following describes the operation of the microcomputer 5 which controls the electromagnetic valve 5F, i.e., a digital actuator.

The displacement of the accelerator pedal, the coolant temperature and the air temperature are sensed in analog values by respective sensors (not shown in the figure), and the sensed signals are subjected to the cyclic selection by an analog multiplexer 5AD in response to the signal from the central processing circuit 5B through a signal line 5r as shown in FIG. 2. The selected sensor signals in analog are transformed into digital values by an A/D converter 5AE, then delivered to the central processing circuit 5B.

Figure 6:
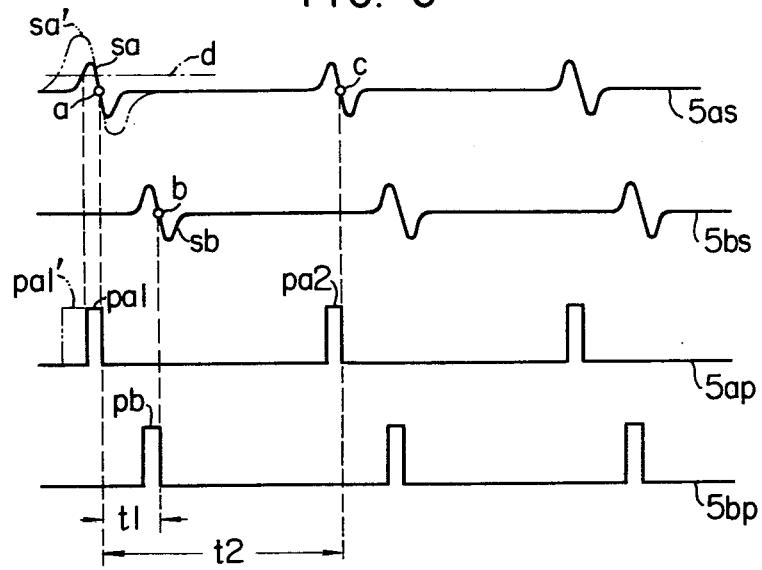
FIG. 6 is a set of waveform charts showing from the top to the bottom the signals 5as and 5bs detected by the electromagnetic pickups 5G and 5H, and the corresponding output signals 5ap and 5bp from the Schmitt circuit in FIG. 2 which transforms the signal from each pickup to a rectangular signal.

The rotational angle of the crank shaft 1a and the output shaft 2b is detected by the electromagnetic pickups 5H and 5G, respectively, to form detection signals 5as and 5bs as shown in FIG. 6, and these signals are supplied to the Schmitt circuit 5AB in FIG. 2. The horizontal axis of the chart in FIG. 6 represents time.

Pulse signals sa and sb in FIG. 6 show the pickup voltages when a boss on each of the disks 1b and 4a passes over each of the electromagnetic pickups 5H and 5G, respectively.

These pulse signals sa and sb are transformed into rectangular pulse signals pa1 and pb, respectively, by the Schmitt circuit 5AB, then delivered to the central processing circuit 5B.

The pulse signals sa and sb vary their waveform as the rotational speed of the crank shaft 1a increases as shown by sa' in FIG. 6, causing the pulse signals pa1 and pb to vary along the time axis as shown by pa1' since they are shaped basing on the reference voltage level d. However, zero crossing points a and b of the pulse signals sa and sb are scarcely affected by the rotational speed, and thus the duration of the pulse signals pa1 and pb is defined on the basis of the points a and b.

Time intervals t1 and t2 represent passing times measured from the pulse signal pa1 to pb, and from pa1 to pa2. The rotational phase angle $P\theta$ between the input shaft 2a and the output shaft 2b, and the rotational speed n of the crank shaft 1a are expressed as follows.

$$P\theta = (c1 \times t1)/t2 \tag{1}$$

$$n = c2/t2 \tag{2}$$

where c1 and c2 are the constants determined from the number of bosses on the disks 1b and 4a, respectively.

The memory 5E in FIG. 1 stores various data necessary for the computation by the central processing circuit 5B.

The system is designed so that the fuel consumption can be minimized or the composition of exhaust gas can be optimized for the diesel engine 1 when the fuel injection timing is set to the ideal point depending on, for example, the coolant temperature, the air temperature, the displacement $\theta$ of the accelerator pedal, and the rotational speed n of the crank shaft 1a. Out of these functional relations, the memory 5E stores reference rotational phase angles $p\theta o$ to be set to the injection timing regulator 2 in relation to the displacement $\theta$ of the accelerator pedal and the rotational speed n of the crank shaft 1a as shown by the memory map in FIG. 5.

Figure 5:
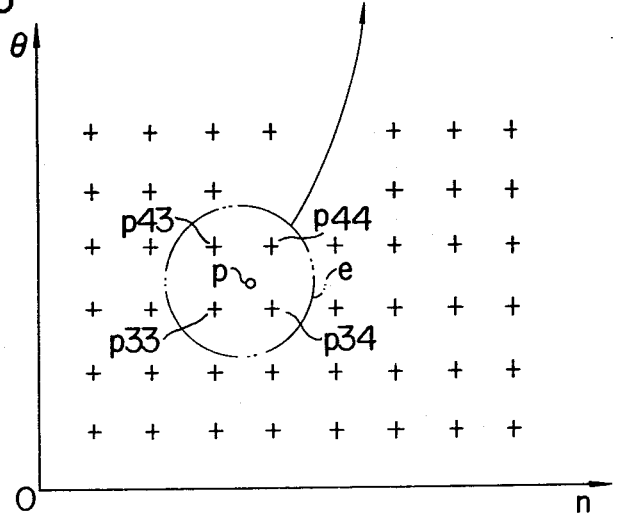
FIG. 5 is a plot showing in discrete values on a plane the reference rotational phase angle of the fuel injection pump which is determined depending on the accelerator pedal position $\theta$ and the engine speed n.

In FIG. 5, each of marks "+" such as p33, p34, p43 and p44 represents a reference rotational phase angle stored in correspondence to a pair of discrete values of the accelerator displacement $\theta$ and the crank shaft speed n taken at a constant interval, and several memory maps are stored for different coolant temperature and air temperature.

In FIG. 5, the reference rotational phase angle $p\theta o$ at the actual operating point p, which is determined from the rotational speed n derived from the electromagnetic pickup 5H and the accelerator displacement $\theta$ at that time, is determined by reference rotational phase angles p33, p34, p43 and p44 in the neighborhood e of the point p.

Figure 4:
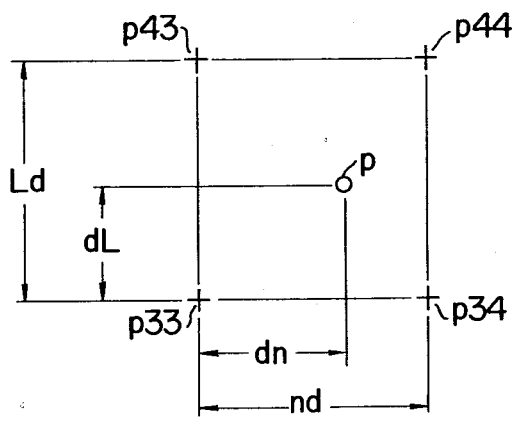
FIG. 4 is a magnified view in the neighborhood e of the plot in FIG. 5.

FIG. 4 shows in detail the neighborhood e of the operating point p, where distances Ld and dL represent the difference of displacement of the accelerator pedal, and distances nd and dn represent the difference of rotational speed. The reference rotational phase angle $p\theta o$ at the point p is computed by the central processing circuit 5B in the following equations.

$$p\theta o = \{(A-B)dn/nd\} + B \tag{3}$$

where $$A = \{(p44 - p34)dL/Ld\} + p34 \tag{4}$$

$$B = \{(p43 - p33)dL/Ld\} + p33 \tag{5}$$

The actual rotational phase angle $p\theta$ obtained by the equation (1) is compared with the reference rotational phase angle pθo obtained by the equation (3), and computation by the central processing circuit 5B proceeds in accordance with the result of the comparison.

The digital control method of this embodiment performs the following control using the computational result of the equations (1) through (5).

Figure 7:
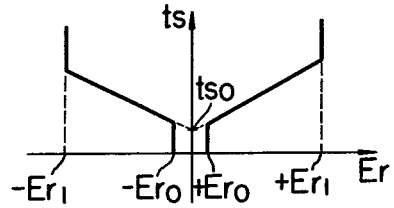
FIG. 7 is a characteristic diagram showing the application period of the command signal sent out over the line 5k in FIG. 1.

Each time the deviation Er of the actual rotational phase angle pθ from the reference rotational phase angle pθo has been computed, a pulse signal having a duration of ts is sent out over the line 5k in FIG. 1 with the application period ts vs. the deviation Er relationship shown in FIG. 7. In FIG. 7, the characteristic on the right of the ts axis represents the application period of the signal supplied to the line 5k1 in FIG. 3, and the characteristic on the left of the ts axis represents the application period of the signal supplied to another line 5k2 which is not shown in the figure. The characteristics on both sides of the ts axis in FIG. 7 have different slopes, since the injection timing regulator 2 needs different forces in operating in one direction and another.

The following describes the steps of computation by the central processing circuit 5B which uses the characteristics of FIG. 7 as an embodiment.

Step 1: Compute the deviation, $Er = p\theta o - p\theta$

Step 2: Compare the absolute value of the deviation Er with the absolute values of the minimum reference deviation Ero and the maximum reference deviation Er1 stored in the memory 5E.

Step 3: If the absolute value of the deviation Er is smaller than the absolute value of the minimum reference deviation Ero, bring the command signal to 0 volt.

Step 4: If the absolute value of the deviation Er is larger than the absolute value of the minimum reference deviation Ero and smaller than the maximum reference deviation Er1, determine the polarity of the deviation Er by the central processing circuit 5E. If the deviation Er is positive, one command signal is sent out over the line 5k1, or if the deviation Er is negative, another command signal is sent out over the line 5k2.

The above-mentioned one command signal and another command signal are rectangular pulses of a duration ts which is a value proportional to the deviation Er and an additional minimum application period tso in FIG. 7.

Step 5: If the absolute value of the deviation Er is larger than the absolute value of the maximum reference deviation Er1, the command signal is sent out over the line 5k1 or 5k2 continuously until the deviation Er is corrected by the command signal down to the state of Step 4.

Figure 8:
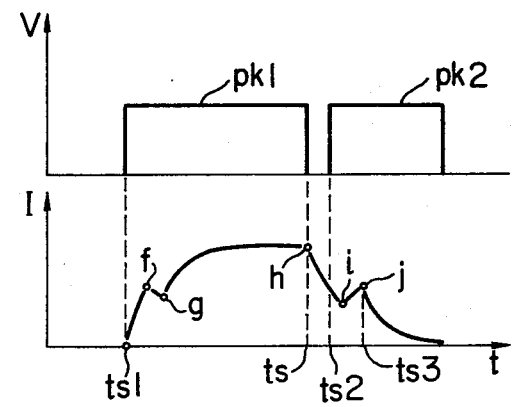
FIG. 8 is a characteristic diagram of the command signal voltage V which is applied to the line 5k in FIG. 1 in accordance with the characteristic shown in FIG. 7.

FIG. 8 shows the command signal as a result of the foregoing computation, where pulses above the time axis are supplied to the line 5k1 and pulses below the time axis are supplied to the line 5k2.

In the foregoing description with reference to FIG. 3, the line 5k in FIG. 1 consists of line 5k1 and 5k2. However, the arrangement may be made such that one command signal in positive voltage and another command signal in negative voltage are sent out over a single line 5k with its one end connected to the output interface circuit 5D1 and another end connected through a polarity inverter to another interface circuit 5D2 (identical to 5k1). In this case, the same operational function as that of the foregoing arrangement will result.

The following describes the characteristics of the current (FIG. 9) flowing through one solenoid 5F1 in FIG. 3 when the first command signal pk1 out of multiple command signals as shown in FIG. 8 is sent out over the line 5k in FIG. 1.

Figure 9:
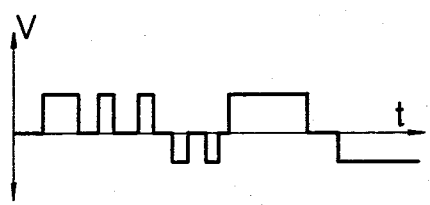
FIG. 9 is a plot showing the current 1 which flows in the solenoid 5F1 in response to the command signal pk1.

In FIG. 9, when the first command signal pk1 is applied to the line 5k at t=ts1 on assumption that the pk1 is a command signal for one direction for example, the pk1 is given to the line 5k1 in FIG. 3. Consequently, the signal voltage is supplied to the base of a transistor TR1 through a resistor R1, and the current I flows from the constant voltage source through lines 5u and 5m, and one solenoid 5F1 to the ground. The timing characteristics of the current are shown by f-g-h-i-j in FIG. 9.

This means that when an offset voltage (command signal pk1) is sent out over the line 5k1, the current I increases gradually in the period from ts1 to f due to the inductance of the solenoid 5F1, and the spool of the electromagnetic valve starts moving at point f. The solenoid 5F1 creates an electromotive force across its winding in response to the movement of the spool, causing the current I to fall in the period between f and g, and when the spool stops in the full opening state at point g, the fall of the current I ceases.

If the command signal voltage is sent out over the line 5k1 continuously after the electromagnetic valve 5F has opened completely, the current increases again up to the saturation level as shown in the period from g to h.

After that when the command signal on line 5k1 falls to 0 volt at point h at t=ts, the current I falls along the characteristic curve from h to i due to the effect of the fly-wheel diode D and resistor R3. When the spool starts moving to close the valve at point i, the solenoid 5F1 creates an electromotive force across its winding, causing the current to increase until point j is reached when the valve is closed completely. After the point j, the current falls again. The identical operation takes place when the command signal is sent out over the line 5k2 (not shown in the figure) so that the electromagnetic valve 5F in FIG. 1 is operated in another direction.

Thus, after the command signal pk1 has ceased at t=ts, the electromagnetic valve 5F keeps opening until t=ts3 at point j in FIG. 9, and the correction of deviation Er lasts in the period from ts to ts3. Such phenomenon will occur in control units other than the electromagnetic valve due to the mechanical or electrical inertia of the control unit as mentioned previously.

Consequently, the deviation Er is likely corrected to the desired range during the response delay time ts-ts3. When the deviation Er is checked in the period ts-ts3 and if the deviation Er has not been corrected to the desired range, the subsequent command signal pk2 (FIG. 9) is issued in the opening state of the electromagnetic valve 5F, whereas normally the deviation Er would have been corrected in the period from ts to ts3, resulting in a correction of the deviation to the desired level and subsequent undesirable overshooting.

The above problem has a further important meaning in control using the characteristics of FIG. 7.

In the characteristics of FIG. 7, when the deviation Er resides within the range from −Er1 to −Ero or from +Ero to +Er1, the application period ts of the command signal has a component in proportion to the deviation Er in consideration of the resistivity of the load, so that the deviation is corrected to the desired level by a single command signal in open loop control, i.e., without the arrangement of the negative feedback control. Consequently, at point j at t=ts3 in FIG. 9, the deviation Er is quite possibly corrected to the range from −Ero to +Ero by the command signal pk1 issued in accordance with the characteristics of FIG. 7. The deviation Er will be corrected to the neighborhood of the range from −Ero to +Ero if it is not corrected within the range.

According to the present invention as described above, the deviation Er used for the subsequent command signal pk2 is measured after a certain time (ts3−ts) has elapsed following the fall of the first command signal pk1, thus reducing the possibility of overshooting in the control system. The period ts3-ts can generally be defined from the characteristics of the electromagnetic valve 5F. Generally, the determination as to whether or not the subsequent output signal is issued following the period ts3−ts can be made appropriately when the detection of the subsequent deviation Er is completed following a certain period of 10-15 ms after the command signal pk1 has ceased at t=ts.

The following describes the method of detecting the subsequent deviation more strictly than the foregoing embodiment. The latest information as a result of correction by the command signal at that time for use in computing the deviation Er is a series of data, i.e., pa1, pb and pb2, which are detected in combination immediately after the electromagnetic valve 5F has been closed at t=ts3 in FIG. 9. Accordingly, it is desirable to use the latest information in determining the subsequent command signal. The following describes how to obtain the latest deviation Er.

As described above, the electromagnetic pickups 5H and 5G detect the pulses pa1, pb and pa2 shown in FIG. 6, and finally the command signal pk1 controls the electromagnetic valve 5F which in turn operates the hydraulic actuator during the period from ts1 to ts3 to complete a sequence of control process. In the subsequent control process, a decision is made as to whether or not the command signal shown in FIG. 9 is issued depending on the consequence of the computation of the equations (1) through (5) and the computational steps 1 through 5. Throughout the sequence of control process from the beginning to the end, the pulse signals 5ap and 5bp in FIG. 6 creates pulses pa1, pb, pa2, and so on cyclically on the lines 5b and 5a in FIG. 1 irrespective of the time interval of t=ts1 through ts3.

This is because the measurement periods t1 and t2 in FIG. 6 becomes shorter in inverse proportion to the rotational speed of the crank shaft 1a, whereas the application period ts of the command signal pk1 and the response delay time ts−ts3 of the electromagnetic valve 5F including the output interface circuit 5D are independent of the rotational speed of the crank shaft 1a.

However, when the sequence of control process is completed by detecting the deviation and issuing the resultant command signal pk1, it is desirable to carry out the subsequent detection of deviation for determining whether or not the subsequent command signal pk2 is issued immediately following the point of t=ts3 (FIG. 9).

By this reason, control of this embodiment performs the subsequent detection of deviation in the foregoing operation in the following method.

As described with reference to FIG. 6 and the equations (1) through (5), the sequence of operation for detecting data used in computing the deviation Er begins with detecting the first data of the pulse pa1 (FIG. 6) by the electromagnetic pickup 5H, which is followed by the detection of the second data of the pulse pb by the electromagnetic pickup 5G, the detection of the final data of the subsequent pulse pa2 by the electromagnetic pickup 5H, and the detection of the accelerator displacement $\theta$ during the period t2 when the pulses pa1 and pa2 are detected. Computation of equations (1) through (5) and computational steps 1 through 5 are carried out basing on these data. Time taken for detecting a series of data from the detection of the pulse pa1 to the detection of the pulse pa2 is in inverse proportion to the rotational speed n of the diesel engine 1 as can be seen from the arrangement of FIG. 1.

Thus, the number of times for the cyclic data detection carried out in the period from ts1 to ts3, i.e., after the command signal pk1 has been issued and until the electromagnetic valve 5F completes the operation, is in proportion to the rotational speed of the diesel engine 1.

On the other hand, the application period ts for the command signal pk1 has been determined by the initial deviation Er used in issuing the command signal pk1 and the response delay of the output interface circuit 5D and the electromagnetic valve 5F has been determined at the time of design. Thus it can be understood that the number of times for a series of data detection for detecting the subsequent deviation within the period from ts1 to ts3 when the hydraulic actuator operates is the function of the initial deviation Er and the rotational speed n.

In the embodiment, by use of the initial deviation Er and the rotational speed for issuing the command signal pk1, the central processing circuit 5B computes the timing of sampling a series of data for computing the subsequent deviation following the initial deviation, and that timing is selected such that the final data detection (detection of pulse pa2) in a series of detection for sampling is carried out after at least the time t=ts3 has elapsed.

When the rotational speed n is very low, the subsequent first pulse pa1 may occur after t=ts3. In the normal speed, the pulses pa1 and pb to be detected will occur in the period from ts1 to ts3, and the pulse pa2 for the final detection data can be detected immediately after t=ts3.

In the above embodiment for detecting data of the deviation Er, a series of data detection for issuing the subsequent command signal pk2 has been described on assumption that a series of data pa1, pb and pa2 for issuing the subsequent command signal pk2 have the same polarity as those data for issuing the previous command signal pk1. However the polarity as used is the representative polarity for the convenience of explanation. Actually a series of data pa1, pb and pa2 detected previously are different from a series of data pa1, pb and pa2 detected subsequently.

The reason for the use of the detection method of this embodiment is as follows. In solely solving the problem of overshooting in the control system as mentioned previously, the initial data pa1 may be sampled after t=ts3. However, in doing so, the final data pa2 will occur with a considerable delay following t=ts3, and the response of the system would possibly be deteriorated when the deviation Er is computed basing on these data and the subsequent command signal pk2 is issued. Therefore, it is desirable to use a combination of data which occur before and after t=ts3. It is further desirable that a series of data in which only the final data (pulse pa2) has occurred immediately after t=ts3 indicate the latest data as a result of control by the command signal pk1, and the computational control of the load (hydraulic actuator) based on the latest data results in the most appropriate control without hunting.

There is another method of selecting a series of data combination in which the final data occurs at least after t=ts3, as described in the following.

The time in the neighborhood of t=ts3 can be determined approximately by detecting that the current I flowing through the solenoid 5F1 (or solenoid 5F2 which is not shown in the figure) falls to a certain level. All series of data combination which occur after t=ts1 for computing the deviation Er are stored in the memory 5E temporarily, then the central processing circuit 5B retrieves the finally recorded data combination from the memory 5E when the circuit 5B determines that t=ts3 is reached, so that computation proceeds based on that data.

In the foregoing first and second embodiments, discussion has been made on data of what timing should be used for determinating the timing of determination as to how the subsequent command signal pk2 following the issue of the command signal pk1 should be processed.

However, an appropriate determination for the control result in response to the command signal pk1 is not only necessary for appropriately determining the process for the subsequent command signal pk2, but has a significant meaning for checking if control according to the present invention goes on normally.

The following describes an embodiment of the method for determining if the control system according to the present invention operates normally.

If the hydraulic actuator in the injection timing regulator 2 does not operate as dictated by the command signal due to, for example, a jamming of a foreign object into the valve section of the electromagnetic valve 5F, a deviation which is detected by the electromagnetic pickups 5H and 5G cannot be corrected by the command signal which is processed by the microcomputer 5 in response to the deviation and sent out over the line 5m.

In such case, the vehicle will run with the emission of undesirable exhaust gas and also in a poor fuel economy.

Figure 10:
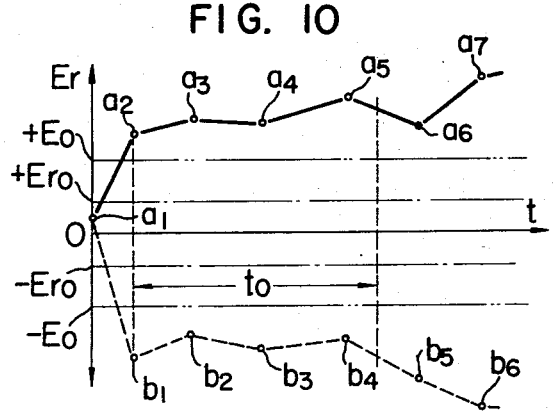
FIG. 10 is a time chart showing the variation of deviation Er when the controller in FIG. 1 fails to operate.

In this embodiment, such situation is determined by the condition shown in FIG. 10, and an alarm is issued in accordance with the result of determination.

In FIG. 10, the current deviation Er is assumed to be located at point a1 within the desired range of deviation from +Ero to −Ero, and further assumption is made that the system fails to operate immediately after the operating point a1, causing the deviation to be detected subsequently at a2, a3, a4, ..., a7, or at b1, b2, b3, ... , b6. If the absolute value of each deviation Er is larger than the absolute value of the predetermined reference deviation Eo stored in the memory 5E and if this state lasts longer than the predetermined period to stored in the memory 5E, it is determined by the central processing circuit 5B in FIG. 1, which then operate a buzzer or lamp to alarm the situation to the operator. If the alarm lasts longer than the predetermined period to1 which is longer than the period to, the microcomputer 5 turns off its power source and the injection timing regulator 2 operates at a leading rotational phase angle at one extreme by the torque for driving the fuel injection pump 4.

The following describes the computation for the alarm carried out by the central processing circuit 5B during the operation of FIG. 10.

The central processing circuit 5B calculates the deviation Er basing on the signal from the Schmitt circuit 5AB. The absolute value of the deviation Er is compared with the absolute value of the reference deviation Eo, and if the absolute value of the deviation Er (a2 or b1 in FIG. 10) is larger than the absolute value of the reference deviation Eo, a timer is activated. The timer starts to count the elapsing time at that time and initiation of counting is stored in the memory 5E. If it is checked again that the absolute value of the subsequent deviation is larger than the absolute value of the reference deviation Eo, the central processing circuit inquires of the memory 5 if the timer has operated. When the operation of the timer is confirmed, the timer continues to count the elapsing time, which is then compared with the predetermined time to by the central processing circuit 5B. If the counted time length exceeds the time to, the central processing circuit 5B issues the signal to the alarm unit.

On the other hand, if the absolute value of the deviation Er is smaller than the absolute value of the reference deviation Eo, the comparison check signal suspends the counting of the timer and clears the timer.

In computation for determining whether the absolute value of the deviation Er is larger or smaller than the absolute value of the reference deviation Eo, the same problems as in the foregoing first and second embodiments will arise as to the deviation Er of that timing should be used for the determination.

The digital control system such as that of the present invention is different from the conventional analogue closed loop system which detects the deviation continuously to issue a control signal at each moment, and thus, in the present invention, a timing relation between the output of the command signal and the detection of the deviation causes a problem. This problem is solved. That is, during the operation of digital control, the command signal pk1 in the form of a single pulse is issued based on the first detection of the deviation on the one hand and a series of data necessary for detecting the deviation is kept supplied cyclically to the computer 5 during the issue of the command signal irrespective of the number of times of the issue of the command signal on the other hand. If a series of data during the issue of these signals is used, regardless of the partition of the signal issue, for evaluating the deviation Er, an intermediate deviation is evaluated instead of evaluating the effect of control by the command signal pk1 as in the cases of the first and second embodiments. That easily leads to the determination, that control is not effective, based on an intermediate deviation which is not yet corrected. Therefore, it is also necessary in the third embodiment that the deviation Er is detected after the command signal pk1 has been issued and immediately after a series of control caused by the command signal has completed at t=ts3 in FIG. 9, in order to determine if the command signal pk1 has been effective for control.

In order to achieve more accurate determination on the control effect by the command signal pk1, it is also desirable to detect a series of data before and after the point of t=ts3 in FIG. 9 by the same detection method as in the second embodiment, because control of this invention is in digital system and a series of data pa1, pb and pa2 are detected consecutively with a certain time interval for computation of the deviation Er.

As can be seen from the foregoing description, the method of detecting the control error in digital control according to the present invention employs the method of detection in consideration of the delay in the control system wherein the deviation Er is detected after the issue of the command signal pk1 has ceased and immediately after the delay time has elapsed, making the determination of the control effect by the command signal pk1 very accurate and also making the determination for the subsequent control action appropriate.

Particularly, the method of detecting the control error according to the present invention is arranged such that the signal application period ts for the command signal pk1 has a component which is in inverse proportion to the absolute value of the deviation Er which has caused the issue of the signal pk1, and therefore the result of control by the command signal pk1 issued basing on the deviation Er likely meets the desired deviation range (−Ero to +Ero). Consequently, the determination of the control result caused by the command signal pk1 is different from such determination that is carried out continuously using the deviation Er calculated from a series of data which is supplied cyclically irrespective of the timing t=ts3 in FIG. 9, thus providing a very accurate information for the subsequent action.

In the method of detecting the control error in digital control according to the present invention, the deviation Er detected by this method determines the signal application period ts of the subsequent command signal pk2, allowing an appropriate, accurate and high response control, thereby minimizing the overshoot and hunting of the control system.

In the method of detecting the control error in digital control according to the present invention, the normality of control is determined by the deviation Er detected in this method, allowing a correct detection for the control result caused by the command signal pk1 owing to the deviation Er detected at each time. This results in a better representation of the control result at each issuing of the command signal as compared with the method of detecting the deviation cyclically irrespective of the issuing of the command signal. Therefore, it is possible to determine if the control system is operated accurately and normally by comparison of individual deviations Er with the predetermined reference deviation Eo.

Moreover, when the method of detecting the control error in digital system according to the present invention is applied to the fuel injection timing regulator for the engine, the control accuracy and response can be enhanced, thereby improving the fuel economy of the engine, making the exhaust gas composition satisfactory, alarming a failure of control, and counteracting the failure of operation for the engine. Thus, driving of a vehicle for a long time in a poor fuel economy or with unsatisfactory exhaust gas composition due to the unawareness of the failure can be prevented.

What we claim is:

1. A method of detecting a control error in digital control according to claim 8, wherein said resultant controlled value comprises a relative rotational phase angle between an input shaft and an output shaft of a fuel injection timing regulator for an engine, said relative rotational phase angle being computed by the steps of detecting each angular position of said input shaft and output shaft by respective electromagnetic pickups, storing, in a computer, data on said angular positions detected by said electromagnetic pickups in the form of a time-series combination of pulses, and performing computation of said relative rotational phase angle on the basis of an interval of the combination of pulse signals.

2. A method of detecting a control error in digital control according to claim 2, wherein said difference value detected after the predetermined time has elapsed is computed by said computer by use of data of a series of combination of pulses supplied by said electromagnetic pickups to said computer with at least the final pulse signal out of said combination of pulse data appearing after said predetermined time has elapsed.

3. A method of digital control for minimizing a difference between a reference command value determined by a condition related to the load and a setup value of the state of loading which has been newly set by control of said reference command value, comprising the step of controlling a control section of an actuator which eventually controls said load by a signal having a finite duration in a direction for minimizing said difference, the subsequent signal following said signal being prevented from issuing during a predetermined time period which begins from expiration of said finite duration of said signal.

4. A method of detecting a control error in digital control, comprising the steps of:
   detecting the difference between said reference command value and a resultant controlled value of an actuator, said resultant controlled balue being determined after a predetermined period has elapsed following said reference command value;
   measuring said predertermined period;
   determining the absolute value of said difference larger than a predetermined value; and
   outputting a command pulse signal having information in accordance with said absolute value of said difference to said actuator, whereby the difference is minimized.

5. A method of detecting a control error in digital control according to any one of claim 4, claim 1 or claim 2, wherein the duration for applying said command signal is in inverse proportion to the absolute value of said difference.

6. A method of detecting a control error in digital control according to any one of claim 4, claim 1 or claim 2, wherein the subsequent determination for control based on the difference value detected after the predetermined time has elapsed is the determination for determining the application period of the subsequent command signal following a first command signal based on said detected difference value.

* * * * *

UNITED STATES PATENT AND TRADEMARK OFFICE
CERTIFICATE OF CORRECTION

PATENT NO. : 4,455,867
DATED : June 26, 1984
INVENTOR(S) : Yuzo Koyanagi

It is certified that error appears in the above-identified patent and that said Letters Patent is hereby corrected as shown below:

Column 11, line 58, change "1" to --2--;

Column 11, line 59, change "8" to --1--;

Column 12, line 12, change "2" to --3--;

Column 12, line 20, change "3" to --6--;

Column 12, line 33, change "4" to --1--;

Column 12, line 47, change "5" to --4--;

Column 12, lines 48 and 49, change "Claim 4, Claim 1 or Claim 2" to --Claim 1, Claim 2 or Claim 3--;

Column 12, line 52, change "6" to --5--;

UNITED STATES PATENT AND TRADEMARK OFFICE
CERTIFICATE OF CORRECTION

PATENT NO. : 4,455,867

DATED : June 26, 1984

INVENTOR(S) : Yuzo Koyanagi

It is certified that error appears in the above-identified patent and that said Letters Patent is hereby corrected as shown below:

Column 12, lines 53 and 54, change "Claim 4, Claim 1 or Claim 2" to --Claim 1, Claim 2 or Claim 3--.

Signed and Sealed this

Third Day of December 1985

[SEAL]

Attest:

Attesting Officer

DONALD J. QUIGG

Commissioner of Patents and Trademarks